(12) United States Patent
Hardy et al.

(10) Patent No.: US 8,616,496 B2
(45) Date of Patent: Dec. 31, 2013

(54) SYSTEMS AND METHODS FOR A SELF-DEPLOYING VEHICLE DRAG DEVICE

(75) Inventors: Brian S. Hardy, El Segundo, CA (US); Jerome K. Fuller, Van Nuys, CA (US)

(73) Assignee: The Aerospace Corporation, El Segundo, CA (US)

( * ) Notice: Subject to any disclaimer, the term of this patent is extended or adjusted under 35 U.S.C. 154(b) by 316 days.

(21) Appl. No.: 13/197,333

(22) Filed: Aug. 3, 2011

(65) Prior Publication Data

US 2013/0032667 A1 Feb. 7, 2013

(51) Int. Cl.
*B64D 17/80* (2006.01)
*B64D 17/52* (2006.01)

(52) U.S. Cl.
USPC .......................................... 244/113; 244/149

(58) Field of Classification Search
USPC ............ 244/158.7, 158.9, 159.1, 172.1, 113, 244/110 D, 139, 142, 147, 149
See application file for complete search history.

(56) References Cited

U.S. PATENT DOCUMENTS

| 1,906,091 | A | * | 4/1933 | Pendergast et al. | 244/146 |
|---|---|---|---|---|---|
| 2,505,954 | A | * | 5/1950 | Frieder et al. | 244/145 |
| 2,511,601 | A | * | 6/1950 | Smith | 244/139 |
| 2,581,645 | A | * | 1/1952 | Frieder et al. | 244/149 |
| 2,718,369 | A | * | 9/1955 | MacMillan | 244/149 |
| 2,729,408 | A | * | 1/1956 | Quilter | 244/113 |
| 2,761,636 | A | * | 9/1956 | Finlay | 244/113 |
| 3,008,675 | A | * | 11/1961 | Steinthal | 244/149 |
| 3,250,499 | A | * | 5/1966 | Carroll | 244/113 |
| 3,387,805 | A | * | 6/1968 | Barnett et al. | 244/138 R |
| 3,497,168 | A | * | 2/1970 | Sidebottom et al. | 244/149 |
| 3,547,376 | A | * | 12/1970 | Van Alstyne | 244/172.1 |
| 4,257,568 | A | * | 3/1981 | Bucker | 244/146 |
| 4,565,341 | A | * | 1/1986 | Zacharin | 244/113 |
| 4,832,288 | A | * | 5/1989 | Kendall et al. | 244/159.2 |
| 4,836,477 | A | * | 6/1989 | Baggarley et al. | 244/147 |
| 4,865,273 | A | * | 9/1989 | Jones | 244/149 |
| 6,199,800 | B1 | * | 3/2001 | Coe | 244/142 |
| 6,685,140 | B2 | * | 2/2004 | Carroll | 244/139 |
| 6,953,173 | B2 | * | 10/2005 | Lukavec | 244/149 |
| 8,006,936 | B1 | * | 8/2011 | Farr, III | 244/147 |
| 2005/0067533 | A1 | * | 3/2005 | Lukavec | 244/149 |

* cited by examiner

*Primary Examiner* — Joseph W Sanderson
(74) *Attorney, Agent, or Firm* — Sutherland, Asbill & Brennan LLP

(57) ABSTRACT

Embodiments of the invention relate to systems and methods for a self-deploying vehicle drag device. In one embodiment, a drag device for a vehicle can be provided. The drag device can include a chute body, wherein the chute body is connected to the vehicle. The drag device can also include at least one collapsible member mounted to the chute body, wherein the at least one collapsible member and chute body are maintained in respective compressed configurations until deployed. Furthermore, the drag device can include at least one device adapted to release the chute body from the vehicle, wherein the chute body and the at least one collapsible member are deployed in expanded configurations with respect to the vehicle.

20 Claims, 5 Drawing Sheets

SYSTEMS AND METHODS FOR A SELF-DEPLOYING VEHICLE DRAG DEVICE

STATEMENT OF GOVERNMENT INTEREST

This invention was made with government support under Contract No. FA8802-09-C-0001 awarded by the Department of the Air Force. The government has certain rights in the invention.

TECHNICAL FIELD

The invention relates generally to vehicles, and more particularly to systems and methods for a self-deploying vehicle drag device.

BACKGROUND OF THE INVENTION

The United States Federal Communications Commission (FCC) requires CubeSats and other picosatellites to be designed to re-enter the atmosphere within 25 years of the end of their useful lifetimes. Without an assistance, it is estimated that a CubeSat may take over 150 years to de-orbit from an 800 km altitude.

One conventional device uses a balloon to assist a CubeSat to re-enter the atmosphere. However, the device requires the satellite to maintain a functioning power system and flight computer. The balloon can be released on command from ground control, and a sub-system on the CubeSat fills the balloon to maintain pressure. Furthermore, the lower earth orbit (LEO) environment contains relatively high levels of atomic oxygen (AO) and solar ultraviolet (UV) which can erode or otherwise degrade certain organic polymers that a conventional balloon device may be made from. Even aluminum-coated polymers can suffer erosion or degradation at microscopic cracks created during manufacturing, storage, and deployment with a conventional balloon device. Though a conventional balloon device may survive the relatively harsh space environment for the long duration currently required by the FCC to de-orbit a CubeSat, such a device would occupy a relatively large portion of the useful volume of the satellite.

SUMMARY OF THE INVENTION

Embodiments of the invention can provide some or all of the above needs. Certain embodiments of the invention can provide systems and methods for a self-deploying vehicle drag device. In one embodiment, a drag device for a vehicle can be provided. The drag device can include a chute body, wherein the chute body is connected to the vehicle. The drag device can also include at least one collapsible member mounted to the chute body, wherein the at least one collapsible member and chute body are maintained in respective compressed configurations until deployed. Furthermore, the drag device can include at least one device adapted to release the chute body from the vehicle, wherein the chute body and the at least one collapsible member are deployed in expanded configurations with respect to the vehicle.

In one aspect of an embodiment, the at least one device adapted to release the chute body from the vehicle can include: an active-type device, or an electrically activated switch.

In one aspect of an embodiment, the at least one device adapted to release the chute body with respect to the vehicle can include one of the following: a passive-type device, a film adapted to degrade or erode over time with exposure to ultraviolet radiation or atomic oxygen, a film adapted to degrade or erode over time due to sublimation or an electro-chemical reaction, a latch adapted to degrade or erode over time due to sublimation or an electro-chemical reaction, or a latch adapted to degrade or erode over time with exposure to ultraviolet radiation or atomic oxygen.

In one aspect of an embodiment, the at least one device adapted to release the chute body with respect to the vehicle can include both an active-type device adapted to release the chute body, wherein the chute body and the at least one collapsible member are deployed in expanded configurations with respect to the vehicle when the active-type device is activated; and a passive-type device adapted to release the chute body, wherein the chute body and the at least one collapsible member are deployed in expanded configurations with respect to the vehicle when the active-type device is not activated or fails to activate.

In one aspect of an embodiment, the drag device can further include a compartment adapted to maintain the chute body and the at least one collapsible member in respective compressed configurations with respect to the vehicle prior to release of the chute body with respect to the vehicle.

In one aspect of an embodiment, the chute body can include one of the following: a dome-shaped fiberglass chute, a polygonal-shaped fiberglass chute, a conical-shaped fiberglass chute, a conical-shaped fiberglass chute with a base, or a circular-shaped fiberglass chute.

In one aspect of an embodiment, the drag device can further include at least one tether connecting the chute body to the vehicle, wherein the chute body is maintained at a predefined distance from the vehicle after the at least one tether is deployed.

In one aspect of an embodiment, the at least tether generates an electrodynamic force on the vehicle.

In one aspect of an embodiment, the vehicle can include one of the following: a rocket stage body, an upper stage vehicle, satellite deployment hardware, a nanosatellite, a picosatellite, a satellite, or a small spacecraft.

In another embodiment, a method for creating drag for a vehicle can be provided. The method can include providing a chute body with at least one collapsible member, wherein the chute body is connected to the vehicle and is maintained in a compressed configuration with respect to the vehicle, and wherein the at least one collapsible member facilitates deployment of the chute body away from the vehicle. The method can also include releasing the chute body with respect to the vehicle, wherein the chute body and the at least one collapsible member are deployed in expanded configuration with respect to the vehicle.

In one aspect of an embodiment, the at least one collapsible member facilitates deployment of the chute body away from the vehicle by one of the following: stored elastic energy, or stored spring energy.

In one aspect of an embodiment, the at least one device adapted to release the chute body from the vehicle can include: an active-type device, or an electrically activated switch.

In one aspect of an embodiment, the at least one device adapted to release the chute body from the vehicle can include one of the following: a passive-type device, a film adapted to degrade or erode over time with exposure to ultraviolet radiation or atomic oxygen, a film adapted to degrade or erode over time due to sublimation or an electro-chemical reaction, a latch adapted to degrade or erode over time due to sublimation or an electro-chemical reaction, or a latch adapted to degrade over time with exposure to ultraviolet radiation or atomic oxygen.

In one aspect of an embodiment, the at least one device adapted to release the chute body from the vehicle can include both an active-type device adapted to release the chute body, wherein the chute body and the at least one collapsible member are deployed in expanded configurations with respect to the vehicle when the active-type device is activated; and a passive-type device adapted to release the chute body, wherein the chute body and the at least one collapsible member are deployed in expanded configurations with respect to the vehicle when the active-type device is not activated or fails to activate.

In one aspect of an embodiment, the method can further include providing a compartment adapted to maintain the chute body and the at least one collapsible flexible loop member in respective compressed configurations with respect to the vehicle prior to release of the chute body with respect to the vehicle.

In one aspect of an embodiment, the chute body can include one of the following: a dome-shaped fiberglass chute, a polygonal-shaped fiberglass chute, a conical-shaped fiberglass chute, a conical-shaped fiberglass chute with a base, or a circular-shaped fiberglass chute.

In one aspect of an embodiment, the chute body is connected to the vehicle by at least one tether connecting the chute body to the vehicle, wherein the chute body is maintained at a predefined distance from the vehicle after the at least one tether is deployed.

In one aspect of an embodiment, the vehicle can include one of the following: a rocket stage body, an upper stage vehicle, satellite deployment hardware, a nanosatellite, a picosatellite, a satellite, or a small spacecraft.

In another embodiment, a drag system for a vehicle comprising one of the following: a rocket stage body, an upper stage vehicle, satellite deployment hardware, a nanosatellite, a picosatellite, a satellite, or a small spacecraft, can be provided. The system can include a chute body, wherein the chute body is connected to the vehicle and is maintained in a compressed orientation with respect to the vehicle. The system can also include at least one collapsible member mounted to the chute body, wherein the at least one collapsible flexible loop member is maintained in a compressed orientation until deployed. The system can further include a compartment adapted to maintain the chute body and the at least one collapsible member in respective compressed configurations prior to release of the chute body with respect to the vehicle. Furthermore, the system can include an active-type device adapted to release the chute body from the compartment, wherein the chute body and the at least one collapsible member are deployed in expanded configurations with respect to the vehicle when the active-type device is activated. Moreover, the system can include a passive-type device adapted to release the chute body from the case, wherein the chute body and the at least one collapsible member are deployed in expanded configurations with respect to the vehicle when the active-type device is not activated or fails to activate.

In one aspect of an embodiment, the chute body can include one of the following: a dome-shaped fiberglass chute, a polygonal-shaped fiberglass chute, a conical-shaped fiberglass chute, a conical-shaped fiberglass chute with a base, or a circular-shaped fiberglass chute.

Other systems, methods, apparatuses, features, and aspects according to various embodiments of the invention will become apparent with respect to the remainder of this document.

BRIEF DESCRIPTION OF DRAWINGS

Figure 1:
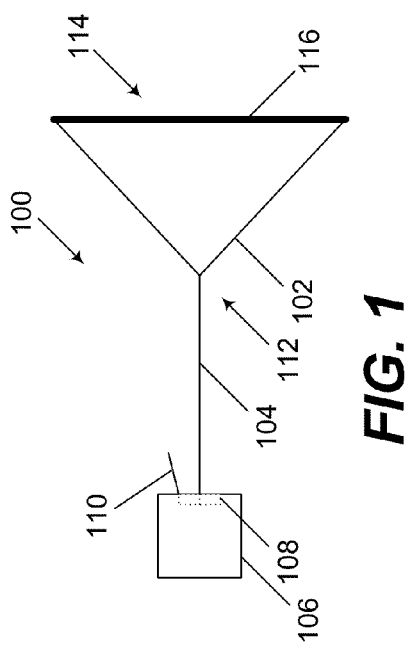

Having thus described embodiments of the invention in general terms, reference will now be made to the accompanying drawings, which are not drawn to scale, and wherein:

FIG. 1 illustrates a schematic view of an example system in a deployed orientation according to an embodiment of the invention.

Figure 2:
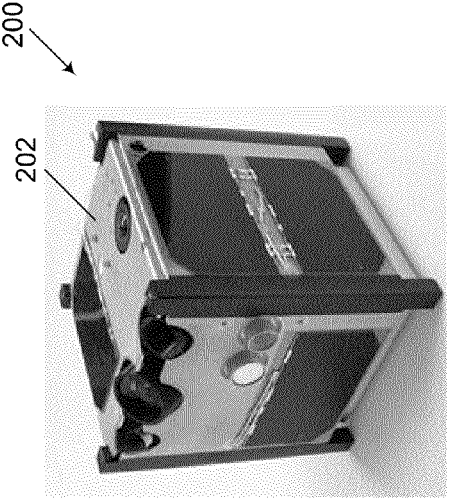

FIG. 2 illustrates an example satellite for use with an example system and method in accordance with an embodiment of the invention.

Figure 3:
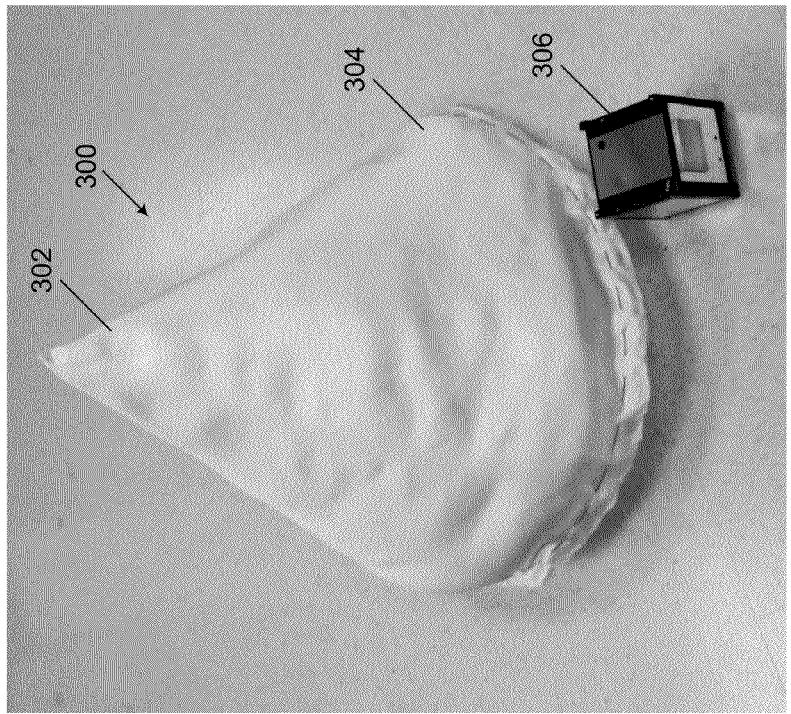

FIG. 3 illustrates an example drag chute adjacent to a satellite in accordance with an embodiment of the invention.

Figure 4:
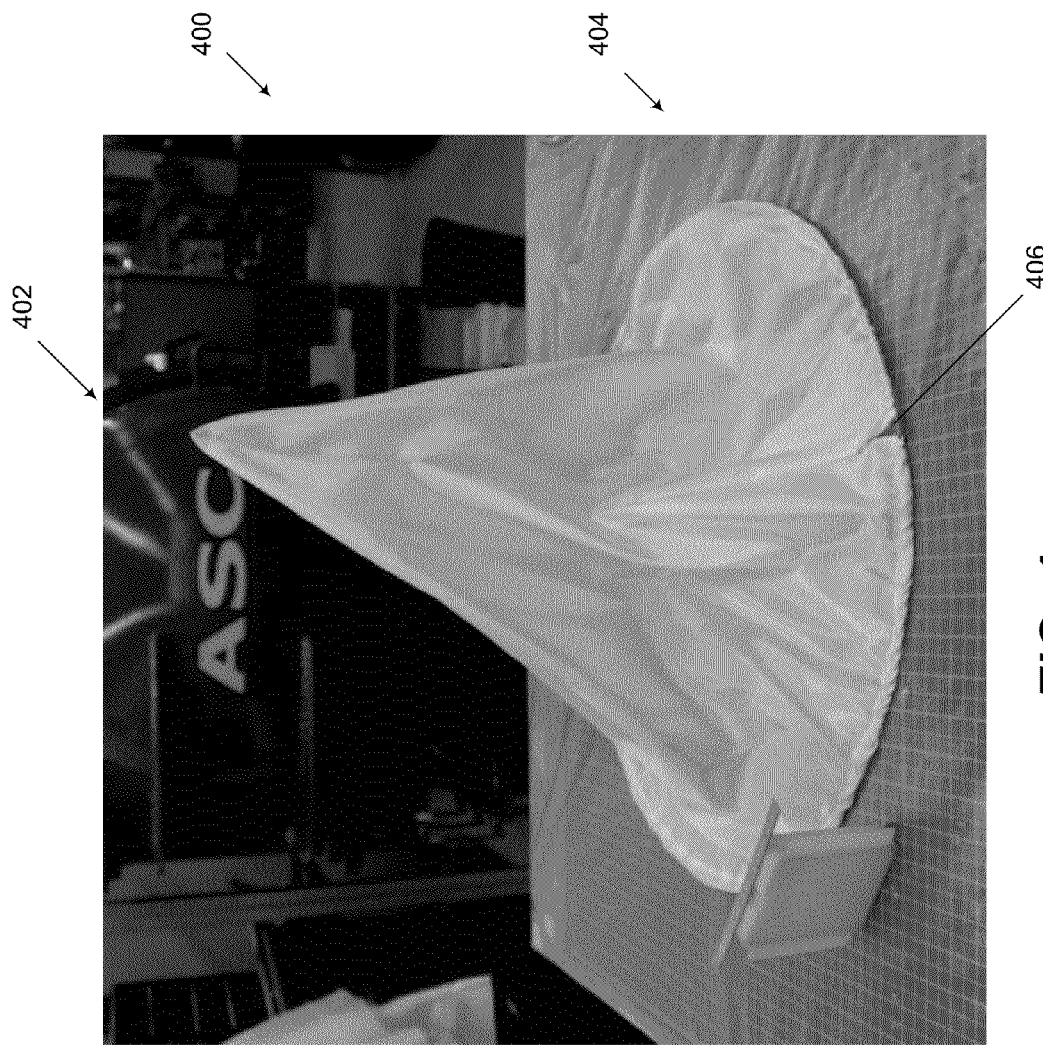

FIG. 4 illustrates another example drag chute in a deployed orientation according to an embodiment of the invention.

Figure 5:
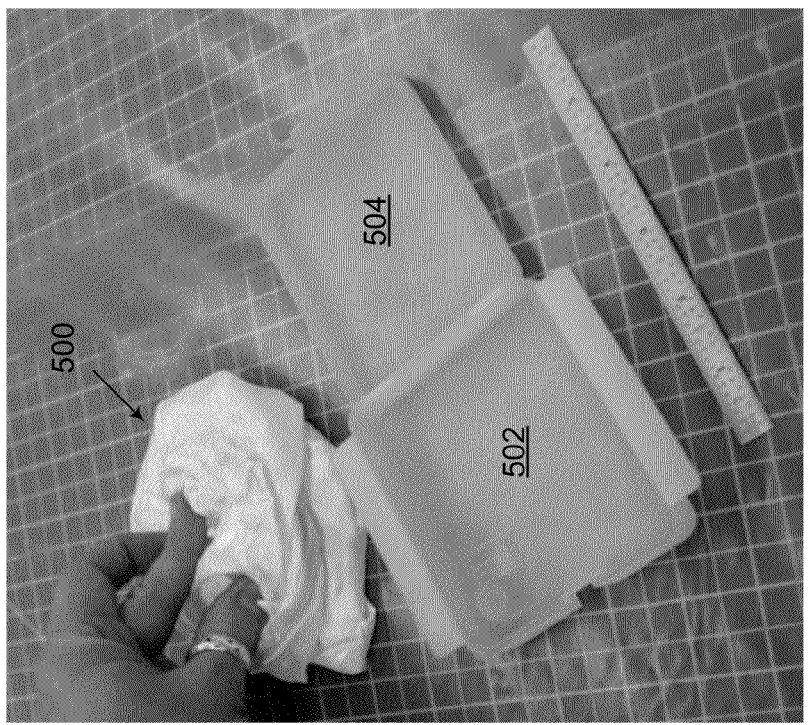

FIG. 5 illustrates an example compartment in an open orientation for a system in accordance with an embodiment of the invention.

Figure 6:
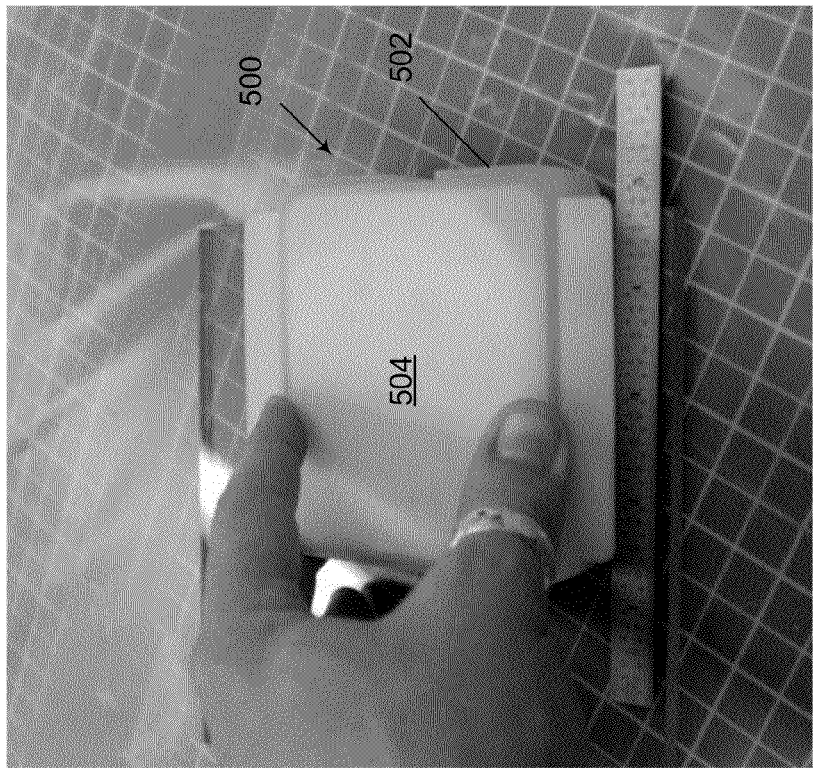

FIG. 6 illustrates an example compartment in a closed orientation for a system in accordance with an embodiment of the invention.

Figure 7:
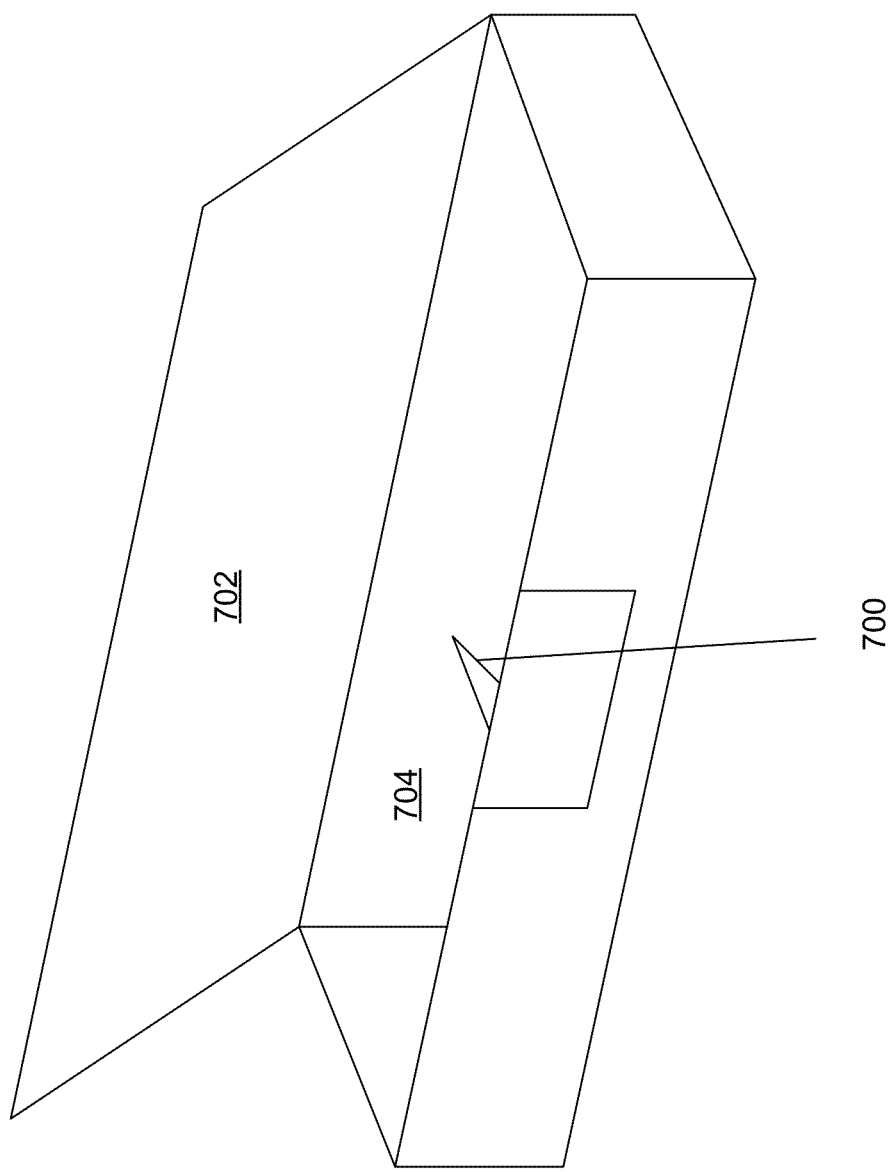

FIG. 7 illustrates an example latch for a system in accordance with an embodiment of the invention.

Figure 8:
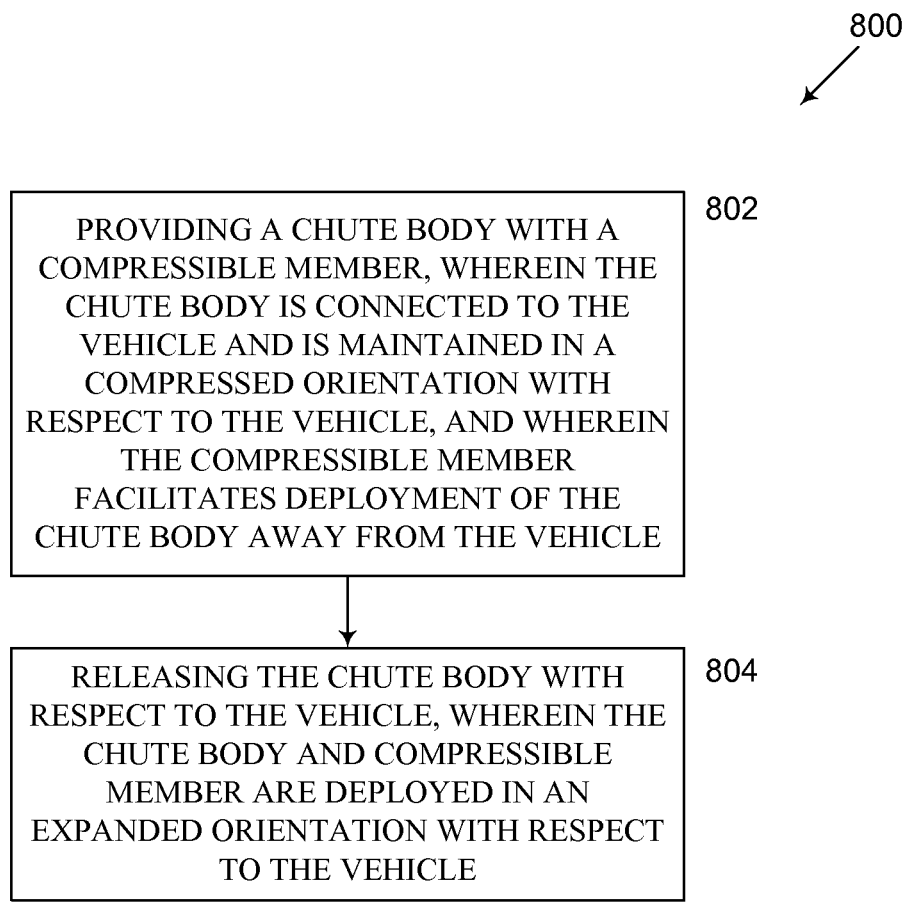

FIG. 8 illustrates a flowchart for an example method in accordance with an embodiment of the invention.

DETAILED DESCRIPTION OF EMBODIMENTS OF THE INVENTION

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention. Like numbers refer to like elements throughout.

As used herein, the term "vehicle" can refer to an independently propelled device or component of such a device. For example, a vehicle can include, but is not limited to, a rocket stage body, an upper stage vehicle, satellite deployment hardware, a nanosatellite, a picosatellite, a satellite, or a small spacecraft.

Certain embodiments of the invention generally provide for systems and methods for a self-deploying vehicle drag device. Certain embodiments of systems and methods described herein can provide a self-deploying drag device for use with a vehicle or component of a vehicle, such as a rocket stage body, an upper stage vehicle, satellite deployment hardware, a picosatellite, a satellite, or a small spacecraft. Since the drag device can be self-deploying, the technical effects of such a device can reduce or otherwise eliminate relatively complex operations of deploying and filling a conventional balloon device as well as alleviating relatively difficult requirements of making a conventional balloon device from materials that can survive the harsh atmospheric conditions and debris environment during orbit. Further technical effects can result, since the drag device can be deployed in the absence of power, communications, or control.

FIG. 1 illustrates an example system in accordance with an embodiment of the invention. In this example, the system can be a drag device deployment system 100. The system 100 is shown with a drag device such as a drag chute 102 or chute body connected by way of at least one tether 104 to a vehicle 106, such as a satellite. The vehicle 106 can include a compartment 108 from which the at least one tether 104 and drag chute 102 or chute body can be deployed from upon opening a releasable door 110. The drag chute 102 or chute body in this embodiment is conical-shaped with an apex end 112 mounted to the at least one tether 104, and an opposing broader end 114. The opposing broader end 114 can include a collapsible member 116 such as a flexible loop made from nitinol or other similar material. It will be appreciated that while the disclosure may in certain instances describe only a single drag chute or chute body, tether, compartment, and releasable door, there may be multiple drag chutes or chute bodies, tethers, compartments, and releasable doors without departing from example embodiments of the invention.

Other system embodiments in accordance with the invention can include fewer or greater numbers of components and may incorporate some or all of the functionality described with respect to the system components shown in FIG. 1.

FIG. 2 illustrates an example satellite for use with an example system and method in accordance with an embodiment of the invention. The example satellite 200 shown in FIG. 2 can be an AeroCube-3™ picosatellite designed and manufactured by The Aerospace Corporation of El Segundo, Calif., United States. Other system and method embodiments can be used with other satellites, for example, the AeroCube-4 (AC4) picosatellite developed by The Aerospace Corporation. In the example shown in FIG. 2, a satellite 200 can measure about 10 by 10 by 10 centimeters and can weigh about 1.0 kilogram, in accordance with a CubeSat specification. The satellite 200 can be powered by one or more solar panels, and can further include a two-axis sun sensor, an Earth sensor, and at least one drag chute or chute body, similar to that shown as 102 in FIG. 1.

At least one panel 202 of the satellite 200 can include a releasable door, similar to 110 in FIG. 1, for covering a compartment, similar to 108, housing a drag chute or chute body. As shown and described below with respect to FIG. 7, a releasable door can include a latch, film, or other mechanism to facilitate self-deployment of the drag chute or chute body. That is, in the absence of satellite power, communications, or control, a releasable door, such as 110, can be opened to permit self-deployment of a drag chute, such as 102, or chute body from a compartment, such as 108, within or associated with the satellite 200.

FIGS. 3 and 4 illustrate example drag chutes or chute bodies in accordance with embodiments of the invention. As shown in FIG. 3, a drag chute 300 or chute body is generally larger than the satellite to which it can be tethered to. The drag chutes 300, 400 or chute bodies shown in FIGS. 3 and 4 are generally conical-shaped with an apex end 302, 402 and an opposing broader end 304, 404. The apex end is generally mounted to the satellite, such as 306 in FIG. 3, via at least one tether, similar to 104 in FIG. 1. The broader end 304, 404 of the drag chute 300 or chute body, 400 is generally circular or hoop-shaped. In the embodiments shown in FIGS. 3 and 4, the drag chute 300, 400 or chute bodies can be made of a relatively flexible fiberglass material to provide about a 2 foot long by 2 foot diameter conical-shaped chute. A collapsible member such as 406 can be hemmed into the broader end 304, 404 of the drag chute 300, 400 or chute bodies, and can be made from an elastic or superelastic-type material, such as nitinol. The collapsible member such as 406 can, for example, be hoop shaped to provide a base for the conical-shaped drag chutes 300, 400 or chute bodies, and to further provide an actuation force for the drag chutes or chute bodies upon deployment from the satellite, such as 306.

In one aspect of an embodiment, a drag chute or chute body can include one of the following: a dome-shaped fiberglass chute, a polygonal-shaped fiberglass chute, a conical-shaped fiberglass chute, a conical-shaped fiberglass chute with a base, or a circular-shaped fiberglass chute. Other suitable durable materials can be used for a drag chute or chute body depending on the desired longevity and/or expected exposure to ultraviolet radiation or other strength and durability requirements for these components.

As shown in FIGS. 5 and 6, a collapsible member, such as 406, and associated drag chute 500 or chute body can be collapsed, compressed, or otherwise folded into a relatively compact shape and fit within a compartment or housing, such as 502. In one example, a collapsible member and associated drag chute or chute body can be collapsed, compressed, or otherwise folded similar to an automobile sunshade. That is, a collapsible member and associated sunshade can be twisted into multiple overlapping loops, such as about eight or nine overlapping loops, and placed within a compartment or housing 502. The compartment or housing 502 with the compact, compressed, or otherwise collapsed collapsible member and associated drag chute or chute body can then be mounted to a single wall or panel of a satellite, such as the satellite 200 in FIG. 2.

The compartment or housing 502 can include a releasable door 504, which may be released by an electrical signal or otherwise may be released by a self-deploying mechanism or technique. One embodiment of a self-deploying mechanism or technique is described and shown below with respect to FIG. 7. When in a closed orientation, the releasable door 504 can maintain the collapsed or compressed collapsible member and drag chute or chute body within the compartment or housing 502 until ready for deployment. When in an open orientation, the releasable door 504 can facilitate deployment or expansion of the collapsed collapsible member and drag chute or chute body to a deployed or expanded orientation from the compartment or housing 502. In any instance, when the releasable door, similar to 110 in FIG. 1, is released or otherwise opened, the collapsed or compressed collapsible member can spring outward from the compartment or housing 502 forcing itself away from the satellite to which the compartment or housing is mounted 502, and thereby causing the drag chute or chute body to attain a deployed or expanded orientation similar to the chute shown in FIGS. 1 and 3-4.

In one aspect of an embodiment, a compartment is adapted to maintain the drag chute or chute body and the at least one collapsible member in respective compressed configurations with respect to the vehicle prior to release of the drag chute or chute body with respect to the vehicle.

As shown in FIG. 1, at least one tether 104 can connect between the drag chute 102 or chute body and the satellite 106. In the embodiments of FIGS. 5 and 6, a tether can be mounted to the drag chute or chute body, and the compartment or housing 502. In one embodiment, a tether can be made from nitinol, and in certain embodiments, can generate an electrodynamic force on the satellite or vehicle to which it is mounted to. In such embodiments, an electrodynamic force could be useful at relatively high altitudes to slowing down the vehicle or otherwise decreasing the altitude of the vehicle. For example, while certain embodiments of drag chute or drag body may not dominate in generating drag on a vehicle de-orbiting at relatively high altitudes, a electrodynamic force generated by the tether could slow down the vehicle or otherwise decrease the altitude of the vehicle, wherein the embodiments of the drag chute or drag body could then be suitable for generating sufficient drag on the vehicle to de-orbit the vehicle.

In one aspect of an embodiment, at least one tether can connect a drag chute or chute body to the vehicle, wherein the drag chute or chute body is maintained at a predefined distance from the vehicle after the at least one tether is deployed.

FIG. 7 illustrates an example latch for a system in accordance with an embodiment of the invention. The latch 700 shown in FIG. 7 can be physical mechanism or device that maintains a releasable door 702 for a compartment 704 in a closed orientation, and over time, the latch 700 can degrade or otherwise erode and then release the releasable door 702 (as shown in FIG. 7) to permit the door 702 to attain an open orientation. A latch can be made from any number of materials that degrade or erode over time with exposure to ultraviolet radiation, atomic oxygen, sublimation, or an electro-chemical reaction. In one embodiment, a latch can be designed to maintain the releasable door 702 in a closed position for about 25 years before degrading or eroding a sufficient amount to release the releasable door 702 to an open position. One suitable material for a latch can be an ultraviolet-sensitive material that degrades over time. In other embodiments, a latch can be a film or other relatively thin material that maintains the releasable door 702 for a compartment 704 in a closed orientation, and over time, the degrades or otherwise erodes and then releases the releasable door 702 to permit the door 702 to attain an open orientation.

In one embodiment, at least one device adapted to release the drag chute or chute body from the vehicle can include, but is not limited to, an active-type device, a passive-type device, or an electrically activated switch.

In one embodiment, a fail safe type mechanism or methodology can be employed for releasing a drag device from a vehicle. For example, a drag device can be equipped with both an active-type device and a passive-type device. The active-type device can be adapted to release a drag chute or chute body, wherein the drag chute or chute body and the at least one collapsible member are deployed in expanded configurations with respect to the vehicle when the active-type device is activated. Examples of active-type devices can be electrically controlled devices, which may be activated from a remote ground station or from a nearby orbiting vehicle or other satellite. The passive-type device can be adapted to release a drag chute or chute body, wherein the drag chute or chute body and the at least one collapsible member are deployed in expanded configurations with respect to the vehicle when the active-type device is not activated or fails to activate. Examples of passive-type devices can be a film adapted to degrade or erode over time with exposure to ultraviolet radiation or atomic oxygen, a film adapted to degrade or erode over time due to sublimation or an electro-chemical reaction, a latch adapted to degrade or erode over time due to sublimation or an electro-chemical reaction, or a latch adapted to degrade or erode over time with exposure to ultraviolet radiation or atomic oxygen.

In the manner described by the embodiments of FIGS. 1-7, a drag device in accordance with embodiments of the invention can provide a mechanically-deployed, parachute-like drag device without some or all of the system complexity and material requirements imposed by conventional balloon devices. For example, a drag device according to certain embodiments of the invention does not include a sealed volume, and does not obtain its drag shape or profile by way of inflation, therefore pressurant and delivery systems can be minimized or otherwise eliminated, thereby reducing system and component complexity and volume while increasing expected reliability. Furthermore, by not having to be a gas tight system, a drag chute according to certain embodiments of the invention can have greater material flexibility needed to go from a collapsed, stored shape to a deployed orientation. This material flexibility can permit the use of composite constructions, for example, woven-type materials rather than relying solely upon the use of a bulk material film or sheet for a drag chute. In addition, a drag device according to certain embodiments of the invention which does not rely on a gas tight system to maintain its shape during or after deployment can tolerate more severe micrometeorite damage or otherwise may be more durable than conventional balloon devices before its drag function may become affected, thereby permitting use at relatively higher orbits. Further, use of a fiberglass material for certain embodiments of drag chutes can make the drag device optically reflective, thereby making the device and satellite relatively easier to track optically as well as visually. Moreover, the fiberglass material used for certain embodiments of drag chutes may not be eroded or degraded by atomic oxygen or ultraviolet radiation, and therefore such drag chutes can survive the relatively harsh LEO environment to which they may be subjected to during the de-orbit of the associated satellite.

One will recognize the applicability of embodiments of the invention to various drag devices, drag chutes, chute bodies, satellites, tethers, compartments, releasable doors, latches, films, and combinations thereof known in the art. One skilled in the art may recognize the applicability of embodiments of the invention to other environments, contexts, and applications. One will appreciate that components of the system 100 shown in and described with respect to FIG. 1 and other embodiments described with respect to FIGS. 2-7 are provided by way of example only. Numerous other operating environments, system architectures, satellites, drag chutes, chute bodies, compartments, tethers, releasable doors, latches, films, and various configurations thereof are possible. Accordingly, embodiments of the invention should not be construed as being limited to any particular operating environment, system architecture, or apparatus configuration.

Embodiments of a system, such as 100, as well as embodiments shown in FIGS. 2-7 can facilitate providing a self-deploying vehicle drag device. Example methods and processes which can be implemented with the example system 100 as well as embodiments shown in FIGS. 2-7 are described by reference to FIG. 8.

FIG. 8 illustrates an example method of creating drag for a vehicle.

The method 800 begins at block 802, in which a chute body is provided with at least one collapsible member, wherein the chute body is connected to the vehicle and is maintained in a compressed configuration with respect to the vehicle, and wherein the at least one collapsible member facilitates deployment of the chute body away from the vehicle.

In one aspect of an embodiment, at least one collapsible member facilitates deployment of the chute body away from the vehicle by one of the following: stored elastic energy, or stored spring energy.

In one aspect of an embodiment, at least one device adapted to release the chute body from the vehicle can include: an active-type device, or an electrically activated switch.

In one aspect of an embodiment, at least one device adapted to release the chute body from the vehicle can include one of the following: a passive-type device, a film adapted to degrade or erode over time with exposure to ultraviolet radiation or atomic oxygen, a film adapted to degrade or erode over time due to sublimation or an electro-chemical reaction, a latch adapted to degrade or erode over time due to sublimation or an electro-chemical reaction, or a latch adapted to degrade over time with exposure to ultraviolet radiation or atomic oxygen.

In one aspect of an embodiment, at least one device adapted to release the chute body from the vehicle can include both an active-type device adapted to release the chute body, wherein the chute body and the at least one collapsible member are deployed in expanded configurations with respect to the vehicle when the active-type device is activated; and a passive-type device adapted to release the chute body, wherein the chute body and the at least one collapsible member are deployed in expanded configurations with respect to the vehicle when the active-type device is not activated or fails to activate.

In one aspect of an embodiment, a chute body can include one of the following: a dome-shaped fiberglass chute, a polygonal-shaped fiberglass chute, a conical-shaped fiberglass chute, a conical-shaped fiberglass chute with a base, or a circular-shaped fiberglass chute.

In one aspect of an embodiment, a vehicle can include one of the following: a rocket stage body, an upper stage vehicle, satellite deployment hardware, a nanosatellite, a picosatellite, a satellite, or a small spacecraft.

Block 802 is followed by block 804, in which the chute body is released with respect to the vehicle, wherein the chute body and the at least one collapsible member are deployed in expanded configuration with respect to the vehicle.

In one aspect of an embodiment, a chute body is connected to the vehicle by at least one tether connecting the chute body to the vehicle, wherein the chute body is maintained at a predefined distance from the vehicle after the at least one tether is deployed.

In one aspect of an embodiment, the method can include providing a compartment adapted to maintain the chute body and the at least one collapsible flexible loop member in respective compressed configurations with respect to the vehicle prior to release of the chute body with respect to the vehicle.

After block 804, the method 800 ends.

Additionally, it is to be recognized that, while the invention has been described above in terms of one or more embodiments, it is not limited thereto. Various features and aspects of the above described invention may be used individually or jointly. Although the invention has been described in the context of its implementation in a particular environment and for particular purposes, its usefulness is not limited thereto and the invention can be beneficially utilized in any number of environments and implementations. Furthermore, while the methods have been described as occurring in a specific sequence, it is appreciated that the order of performing the methods is not limited to that illustrated and described herein, and that not every element described and illustrated need be performed. Accordingly, the claims set forth below should be construed in view of the full breadth of the embodiments as disclosed herein.

The claimed invention is:

1. A drag device for a vehicle, the device comprising:
   a chute body, wherein the chute body is connected to the vehicle;
   at least one collapsible member mounted to the chute body, wherein the at least one collapsible member and chute body are maintained in respective compressed configurations until deployed; and
   at least one device adapted to release the chute body from the vehicle, wherein the chute body and the at least one collapsible member are deployed in expanded configurations with respect to the vehicle, wherein the at least one device comprises a passive-type device adapted to degrade or erode over time in order to release the chute body.

2. The drag device of claim 1, wherein the at least one device adapted to release the chute body from the vehicle comprises: an active-type device, or an electrically activated switch.

3. The drag device of claim 1, wherein
   the passive-type device comprises one of the following: a film adapted to degrade or erode over time with exposure to ultraviolet radiation or atomic oxygen, a film adapted to degrade or erode over time due to sublimation or an electro-chemical reaction, a latch adapted to degrade or erode over time due to sublimation or an electro-chemical reaction, or a latch adapted to degrade or erode over time with exposure to ultraviolet radiation or atomic oxygen.

4. The drag device of claim 1, wherein the at least one device adapted to release the chute body with respect to the vehicle comprises both
   an active-type device adapted to release the chute body, wherein the chute body and the at least one collapsible member are deployed in expanded configurations with respect to the vehicle when the active-type device is activated; and
   the passive-type device adapted to release the chute body, wherein the chute body and the at least one collapsible member are deployed in expanded configurations by the passive-type device with respect to the vehicle when the active-type device is not activated or fails to activate.

5. The drag device of claim 1, further comprising:
   a compartment adapted to maintain the chute body and the at least one collapsible member in respective compressed configurations with respect to the vehicle prior to release of the chute body with respect to the vehicle.

6. The drag device of claim 1, wherein the chute body comprises one of the following: a dome-shaped fiberglass chute, a polygonal-shaped fiberglass chute, a conical-shaped fiberglass chute, a conical-shaped fiberglass chute with a base, or a circular-shaped fiberglass chute.

7. The drag device of claim 1, further comprising:
   at least one tether connecting the chute body to the vehicle, wherein the chute body is maintained at a predefined distance from the vehicle after the at least one tether is deployed.

8. The drag device of claim 7, wherein the at least one tether generates an electrodynamic force on the vehicle.

9. The drag device of claim 1, wherein the vehicle comprises one of the following:
   a rocket stage body, an upper stage vehicle, satellite deployment hardware, a nanosatellite, a picosatellite, a satellite, or a spacecraft.

10. A method for creating drag for a vehicle, the method comprising:
    providing a chute body with at least one collapsible member, wherein the chute body is connected to the vehicle and is maintained in a compressed configuration with respect to the vehicle, and wherein the at least one collapsible member facilitates deployment of the chute body away from the vehicle; and
    releasing the chute body with respect to the vehicle, wherein the chute body and the at least one collapsible member are deployed in expanded configuration with respect to the vehicle, wherein the at least one device comprises a passive-type device adapted to degrade or erode over time in order to release the chute body.

11. The method of claim 10, wherein the at least one collapsible member facilitates deployment of the chute body away from the vehicle by one of the following: stored elastic energy, or stored spring energy.

12. The method of claim 10, wherein the at least one device adapted to release the chute body from the vehicle comprises: an active-type device, or an electrically activated switch.

13. The method of claim 10, wherein the passive-type device comprises one of the following: a film adapted to degrade or erode over time with exposure to ultraviolet radiation or atomic oxygen, a film adapted to degrade or erode over time due to sublimation or an electro-chemical reaction, a latch adapted to degrade or erode over time due to sublimation or an electro-chemical reaction, or a latch adapted to degrade over time with exposure to ultraviolet radiation or atomic oxygen.

14. The method of claim 10, wherein the at least one device adapted to release the chute body from the vehicle comprises both
an active-type device adapted to release the chute body, wherein the chute body and the at least one collapsible member are deployed in expanded configurations with respect to the vehicle when the active-type device is activated; and
the passive-type device adapted to release the chute body, wherein the chute body and the at least one collapsible member are deployed in expanded configurations by the passive-type device with respect to the vehicle when the active-type device is not activated or fails to activate.

15. The method of claim 10, further comprising:
providing a compartment adapted to maintain the chute body and the at least one collapsible flexible member in respective compressed configurations with respect to the vehicle prior to release of the chute body with respect to the vehicle.

16. The method of claim 10, wherein the chute body comprises one of the following:
a dome-shaped fiberglass chute, a polygonal-shaped fiberglass chute, a conical-shaped fiberglass chute, a conical-shaped fiberglass chute with a base, or a circular-shaped fiberglass chute.

17. The method of claim 10, wherein the chute body is connected to the vehicle by at least one tether connecting the chute body to the vehicle, wherein the chute body is maintained at a predefined distance from the vehicle after the at least one tether is deployed.

18. The method of claim 10, wherein the vehicle comprises one of the following: a rocket stage body, an upper stage vehicle, satellite deployment hardware, a nanosatellite, a picosatellite, a satellite, or a spacecraft.

19. A drag system for a vehicle comprising one of the following: a rocket stage body, an upper stage vehicle, satellite deployment hardware, a nanosatellite, a picosatellite, a satellite, or a spacecraft, the system comprising:
a chute body, wherein the chute body is connected to the vehicle and is maintained in a compressed orientation with respect to the vehicle;
at least one collapsible member mounted to the chute body, wherein the at least one collapsible flexible member is maintained in a compressed orientation until deployed;
a compartment adapted to maintain the chute body and the at least one collapsible member in respective compressed configurations prior to release of the chute body with respect to the vehicle;
an active-type device adapted to release the chute body from the compartment, wherein the chute body and the at least one collapsible member are deployed in expanded configurations with respect to the vehicle when the active-type device is activated; and
a passive-type device adapted to degrade or erode over time in order to release the chute body from the case, wherein the chute body and the at least one collapsible member are deployed in expanded configurations by the passive-type device with respect to the vehicle when the active-type device is not activated or fails to activate.

20. The system of claim 19, the chute body comprises one of the following: a dome-shaped fiberglass chute, a polygonal-shaped fiberglass chute, a conical-shaped fiberglass chute, a conical-shaped fiberglass chute with a base, or a circular-shaped fiberglass chute.

\* \* \* \* \*